United States Patent [19] [11] 4,446,213
Steinleitner [45] May 1, 1984

[54] ELECTROCHEMICAL STORAGE CELL
[75] Inventor: Günther Steinleitner, Schriesheim, Fed. Rep. of Germany
[73] Assignee: Brown, Boveri & Cie AG, Mannheim, Fed. Rep. of Germany
[21] Appl. No.: 374,239
[22] Filed: May 3, 1982
[30] Foreign Application Priority Data
May 5, 1981 [DE] Fed. Rep. of Germany ....... 3117619
[51] Int. Cl.³ ........................................... H01M 4/36
[52] U.S. Cl. .................................... 429/104; 429/191
[58] Field of Search ............. 429/104, 191, 112, 30–33
[56] References Cited
U.S. PATENT DOCUMENTS
4,029,858  6/1977  Evans et al. ......................... 429/104
4,044,194  8/1977  Evans et al. ......................... 429/104
4,204,035  5/1980  King ................................... 429/104
4,206,272  6/1980  Fischer et al. ................... 429/104 X
4,226,923 10/1980  Mikkor ............................... 429/104
4,246,325  1/1981  Hatch .............................. 429/104 X
4,247,605  1/1981  Paquette .......................... 429/104 X
4,294,897 10/1981  Bindin ................................ 429/104

Primary Examiner—Charles F. LeFevour
Attorney, Agent, or Firm—Herbert L. Lerner; Laurence A. Greenberg

[57] ABSTRACT

Electrochemical storage cell or battery with at least one anode space for receiving the anolyte and one cathode space for receiving the catholyte which spaces are separated from each other by an alkali ion-conducting solid electrolyte and are bounded at least in some places by a metallic housing. A safety space which is subdivided into at least two safety zones, adjoins at least in some places, the solid electrolyte.

17 Claims, 5 Drawing Figures

ELECTROCHEMICAL STORAGE CELL

BACKGROUND OF THE INVENTION

1. Field of the Invention

The invention relates to an electrochemical storage cell of the alkali metal and chalcogen type with a least one anode space for receiving the anolyte, and a cathode space for receiving the catholyte, which spaces are separated from each other by an alkali ion-conducting solid electrolyte and are confined, at least in regions, by a metallic housing.

2. Description of the Prior Art

Such rechargeable electrochemical storage cells with a solid electrolyte are highly suitable for constructing storage batteries of high energy and power density. The solid electrolytes which are used in the alkali/chalogen storage cells and are made, for instance, of beta-aluminum oxide, are distinguished by the property that the partial conductivity of the mobile ion is very high and the partial conductivity of the electrons is smaller by several powers of ten. By the use of such solid electrolytes for the construction of electrochemical storage cells, there is achieved practically no self-discharge, since the electron conductivity is negligible and the reactive substances cannot get through the solid electrolyte as neutral particles.

A specific example for such rechargeable electrochemical storage cells are those based on sodium and sulfur, and the solid electrolyte is made of beta-aluminum oxide. One advantage of these electrochemical storage cells is that no electrochemical side reactions occur during charging. The reason for this is that only one kind of ions can get through the solid electrolyte. The current yield of such a sodium/sulfur storage cell is therefore nearly 100 percent. In these electrochemical storage cells, the ratio of the energy content to the total weight of such a storage cell is very high as compared to lead storage batteries, since the reactive substances are light and much energy is liberated during the electrochemical reaction. Electrochemical storage cells of the sodium-and-sulfur type therefore have considerable advantages over conventional storage cells such as lead storage cells.

Electrochemical storage cells of this type have the disadvantage that the destruction of the solid electrolyte can come about if an excessively high voltage is applied to the storage cells. Aging or mechanical damage of the solid electrolytes of such storage cells also can lead to breakage thereof. As a consequence, the sodium and sulfur flow together and can react directly with each other. A great temperature rise within the storage cell can come about so that, in the extreme cases, the destruction of the metallic cell housing or of the entire storage cell due to an explosion can come about.

SUMMARY OF THE INVENTION

It is therefore an object of the invention to provide a storage cell in which the direct confluence of sodium and sulfur is prevented in the event of a breakage of the solid electrolyte.

With the foregoing and other objects in view, there is provided in accordance with the invention an electrochemical storage cell or battery based on alkali metal and chalogen comprising at least one anode space for receiving the alkali metal anolyte and one cathode space for receiving the chalcogen catholyte, an alkali ion-conductive solid electrolyte separating the reactant spaces from each other, the cell bounded at least in some places by a metallic housing, and a safety space subdivided into at least two safety zones adjoining the solid electrolyte.

Other features which are considered as characteristic for the invention are set forth in the appended claims.

Although the invention is illustrated and described herein as embodied in an electrochemical storage cell, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages therein will be best understood from the following description when read in connection with the accompanying drawings, in which.

DETAILED DESCRIPTION OF THE INVENTION

Figure 1:
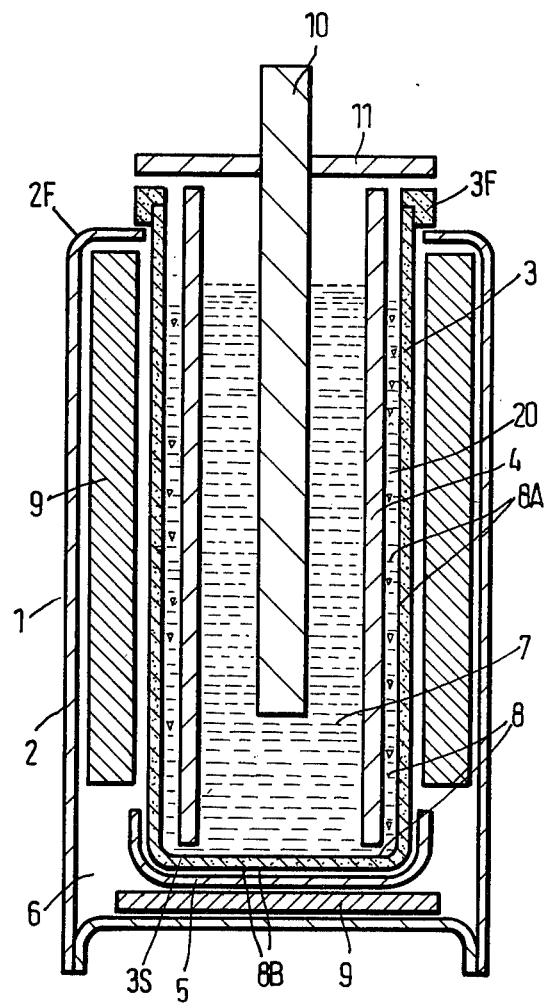
FIG. 1 diagrammatically illustrates a vertical cross section of a storage cell in accordance with the invention in which an outer metallic housing has an inner cup-shaped solid electrolyte. Inside the electrolyte is sodium and between the electrolyte and the housing is sulfur or sodium sulfide or both. Spaced a short distance from the solid electrolyte is a support element thus forming a first safety zone. A second safety zone is formed by a casing in the cathode space, a short distance from the bottom of the solid electrolyte.

In a storage cell of the type mentioned at the outset, the solid electrolyte has, at least in some areas, a safety space which is subdivided into at least two safety zones, adjoining the solid electrolyte.

In one embodiment of the invention, the first safety zone is arranged in the anode space and the second safety zone in the cathode space. In a second embodiment example, both safety zones are arranged in the anode space.

According to the invention, the anode space can be arranged in the inner region of the solid electrolyte. However, the storage cell may be operated as an inverted cell, utilizing the annular space between the solid electrolyte and the metal housing as the anode space.

In the storage cell according to the invention, the solid electrolyte is cup-shaped. A solid electrolyte which has a round dome at its closed end may also be employed. Likewise, a solid electrolyte can be used which is closed off by a round disc. The two safety zones forming the safety space are arranged to overlap in places.

The first region of the safety space extending in the anode space is defined by a support element, the outside surfaces of which extend parallel and at a defined distance from the lateral boundary surfaces of the solid electrolyte. The dimensions of the support element are chosen so that its distance from the lateral boundary surfaces of the solid electrolyte is as small as possible and is maximally 1 to 2 mm.

The support element is matched over its entire length to the geometry of the solid electrolyte, so that a uniform distance remains everywhere between the support element and the solid electrolyte. In all embodiments, the support element is tubular and is preferably made of aluminum, an aluminum alloy, or steel.

In one embodiment of the storage cell according to the invention, the second safety zone of the safety space directly adjoining the solid electrolyte, is arranged within the cathode space and is defined by a casing which extends at a definite defined distance from the closed end of the solid electrolyte. The casing is adapted to the geometry of the solid electrolyte, particularly to the geometry of its closed end. If the solid electrolyte has a round dome, then the casing is preferably designed as a cap. In any event, the dimensions of the casing are chosen so that it surrounds the closed end of the solid electrolyte completely in such a manner that there is an overlap of the two safety zones. The distance of the casing from the closed end of the solid electrolyte is maximally 1 to 2 mm.

The safety zone between the casing and the solid electrolyte is filled with an inert material.

In all embodiments, the casings used for bounding the second safety zone is made of aluminum, an aluminum alloy, alloy steel, graphite, ceramic, or molybdenum.

The casing defining the second safety zone can, of course, also be arranged within the anode space. This means that both safety zones forming the safety space around the solid electrolyte are arranged in the anode space.

In another embodiment of the invention, the casing defining the second safety zone is formed by the bottom of the metallic housing of the storage cell. The bottom of the metallic housing has in particular a tray- or U-shaped cross section in the region of the solid electrolyte.

The direct confluence of sodium and sulfur is largely prevented, due to the above-described measures and is at least slowed down considerably in time. In this storage cell, a break of the solid electrolyte causes no destruction of the cell jacket. The arrangement of the safety space which is directly adjacent to the solid electrolyte does not reduce the delivery of power by the storage cell; rather it is just as large as in the storage cells known to date. While the casing arranged around the closed end of the solid electrolyte causes a limitation of the passage of sodium ions in this region, this has the advantage that at this point, aging of the solid electrolyte is prevented, so that destruction of the same is almost impossible.

The invention will be explained in the following with reference to the drawings.

The electrochemical storage cell 1 shown in FIG. 1 is formed substantially by a cup-shaped housing 2 which is made of metal, and a solid electrolyte 3. The solid electrolyte 3, likewise cup-shaped, is arranged in the interior of the metallic housing 2. In the embodiment shown here the solid electrolyte 3 is made of beta aluminum oxide. The dimensions of the solid electrolyte 3 are chosen so that between its outer surfaces and the inside surfaces of the metallic housing 2, a coherent space is formed which serves as the cathode space. The metallic housing 2 is provided at the open end with a flange 2F pointing inward. The solid electrolyte 3 has a flange 3F pointing outward. The latter is made of alpha-aluminum oxide and connected via a glass solder joint (not shown here) to the solid electrolyte 3 in a force-locking manner. The flange 3F is placed on the flange 2F of the metallic housing 2 and is sealed. As mentioned already above, the solid electrolyte 3 is cup-shaped. The closure at the second end of the solid electrolyte is formed by a round disc 3S, which is connected to the solid electrolyte in the conventional manner and is preferably made of beta-aluminum oxide. The support element 4 designed as a tube is arranged in the interior of the solid electrolyte 3. The support element is made slightly shorter than the solid electrolyte 3. Its diameter is chosen so that between its outside surfaces and the inside surfaces of the solid electrolyte 3, a space forming the safety zone 8A of the safety space 8 remains. The support element 4 is made, in the embodiment described here, of aluminum, an aluminum alloy or steel. The same applies for all other support elements described in the further embodiment examples. The length of the support element is made to extend from the open end of the solid electrolyte 3 to the closed end of the solid electrolyte 3. The closed end of the solid electrolyte 3 is not covered by the support element 4. The safety zone 8A defined by the support element 4 is filled with a capillary-active material 20. The inside area of the support element contains exclusively sodium. The support element 4 is arranged within the solid electrolyte 3 in such manner that between its bottom 3S and the lower boundary of the support element 4 a narrow gap remains. Thereby the interior of the support element 4 is always in communication with the capillary-active material 20 within the safety zone 8A. The capillary-active material 20 causes a continuous transport of the sodium to the inner boundary surfaces of the solid electrolyte 3. This ensures complete discharge of the charge storage cell 1. Further, the support element 4 causes the capillary-active material 20 arranged in the safety zone 8A to press uniformly against the lateral boundary surfaces of the solid electrolyte 3.

As already mentioned above, the cathode space 6 is provided between the solid electrolyte 3 and the metallic housing 2. A second safety zone 8B is provided within the cathode space 6 to protect the closed solid-electrolyte end 3S. This safety zone 8B is arranged around the closed end of the solid electrolyte 3. The second safety zone 8B is bounded by the casing 5. The second safety zone 8B, together with the safety zone 8A disposed in the anode space, forms a safety space 8 surrounding the solid electrolyte 3. The casing 5 conforms substantially to the geometry of the closed solid electrolyte end 3. The lateral boundary surfaces of the casing 5 are brought upward so far that they extend beyond the lower end of the support element 4 arranged in the anode space. The casing 5 is placed so that between it and the closed end 3S of the solid electrolyte 3, the empty space forming the safety zone 8B remains. The distance between the casing 5 and the solid electrolyte is only 1 to 2 mm. The casing 5 in the embodiment example described here is made of aluminum, an aluminum alloy, alloy steel, graphite, ceramic or molybdenum. The same applies for all casings 5 described in the following embodiment examples. Desirably, a graphite felt 9 is inserted between the casing 5 and the bottom of the metallic housing 2. The distance between the casing 5 and the solid electrolyte 3 can be regulated through appropriate choice of the felt 9 thickness. The other areas of the cathode space 6 are likewise filled with a graphite felt 9 which is saturated with sulfur like the graphite felt 9 arranged under the casing 5.

In the embodiment of the storage cell shown here, the metallic housing 2 serves as the cathodic current collector. An anodic current collector 10 extends into the interior of the solid electrolyte 3, which serves as the anode space 7. The current collector 10 is pushed through the terminating or closure plate 11 of the storage cell and extends beyond the same by several mm. A metal rod is preferred as the anodic current collector 10. The safety zone 8B is filled with an inert material.

Figure 2:
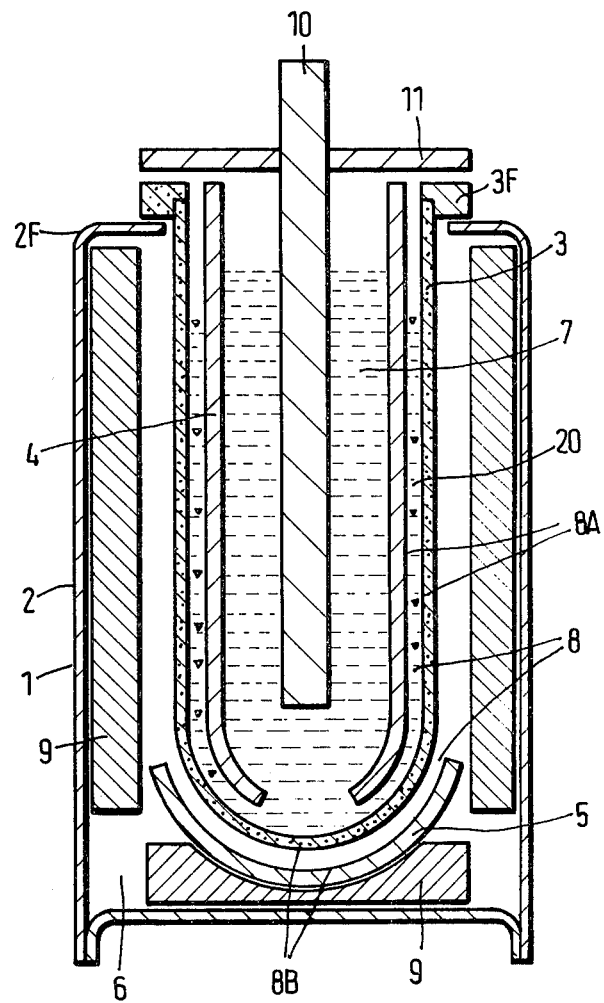
FIG. 2 is a variant of the storage cell shown in FIG. 1. In particular, it should be noted that the bottom closed end of the electrolyte is in the shape of a dome and the support element and casing conform to that shape.

FIG. 2 is a variant of the storage cell shown in FIG. 1. It is substantially of the same design as the storage cell 1 shown in FIG. 1. A support element 4 in the form of a tube is in the interior of the solid electrolyte 3. The dimensions of support element of FIG. 2 correspond to the dimensions of the support element 4 shown in FIG. 1. Support element 4 over its entire length conforms to the geometry of the solid electrolyte 3. In particular, the lateral boundary surfaces of the support element 4 which is designed as a tube is slightly bent inward at the lower end so that it follows the contour of the round dome of the bottom of electrolyte 3. Between the support element 4 and the solid electrolyte 3 there is the first safety zone 8A which is filled with a capillary-active material 20. The interior of the support element 4 contains sodium.

Through a gap between the lower end of the support element 4 and the solid electrolyte 3, the sodium can be brought with the aid of the capillary-active material to the boundary surfaces of the solid electrolyte. In order to obtain particularly good contact between the inner zone of the support element 4 and the capillary-active material 20 within the first safety zone 8A, steel wool can be inserted into the gap between the lower end of the support element 4 and the solid electrolyte.

In this embodiment example, the cathode space 6 is also located between the solid electrolyte 3 and the metallic housing 2. A casing 5 is also arranged here at a predeterminable distance from the closed end of the solid electrolyte 3 to form the second safety zone 8B, which is filled with an inert material. The casing 5, designed preferably as a cap, surrounds the lower end of the solid electrolyte 3 completely. The cap 5 is drawn upward to extend beyond the lower end of the support element 4 which is arranged in the anode space 7. In order to obtain the desired distance between the casing 5 and the solid electrolyte 3, a graphite felt 9 of a defined thickness is again inserted between the casing 5 and the bottom of the metallic housing 2. The remaining area of the cathode space 6 is likewise filled with a graphite felt 9 which is saturated with sulfur. A metal rod 10 extends into the anode space and serves as the anodic current collector. The metal rod 10 goes through the cover plate 11 of the storage cell 1 and extends a few mm beyond the latter.

Figure 3:
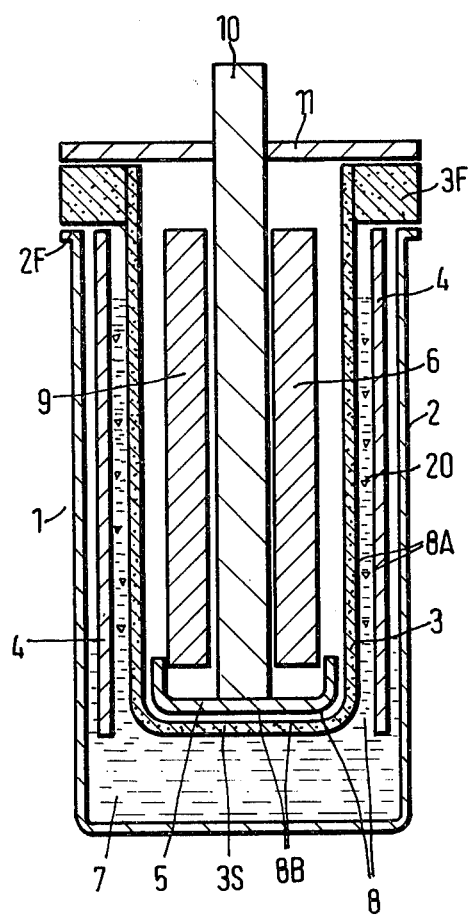
FIG. 3 is an inverted storage cell wherein the catholyte is in the interior of the electrolyte and the sodium is between the electrolyte and the housing.

FIG. 3 shows an inverted storage cell 1 which likewise has a safety space 8 around the solid electrolyte 3. This storage cell is constructed essentially like the storage cell 1 which is shown in FIG. 1 and described in the specification. A substantial difference, however, is the fact that the cathode space 6 is within the solid electrolyte 3, while the anode space 7 is between the metallic housing 2 and the solid electrolyte 3. The first safety zone 8A is bounded by a support element 4. The latter is shaped as a tube and is arranged around the solid electrolyte 3. The diameter of the support element 4 is chosen so that a space remains between it and the solid electrolyte 3, which space forms the safety zone 8A. The length of the support element 4 extends up to the open upper end of the solid electrolyte and extends beyond the lower end of the solid electrolyte 3 by a few mm. The first safety zone 8A is filled with a capillary-active material 20. The entire region of the anode space 7 contains sodium. The transport of the sodium to the outside surfaces of the solid electrolyte 3 is promoted by the capillary-active material 20. An effect of the support element 4 is to obtain an optimum contact between the capillary-active material 20 and the solid electrolyte 3. The metallic housing 2 serves as the anodic current collector. The cathode space 6 is disposed, as already mentioned in the interior of the solid electrolyte 3. The solid, cup-shaped electrolyte 3 is terminated by a round disc 3S. A casing 5 within the cathode space 6, is arranged at a small distance from the disc 3S. The space between the disc 3S and the casing 5 forms the second safety zone 8B. The second safety zone can be filled with an inert material. The casing 5 completely covers the disc 3S and is drawn upward by several mm parallel to the lateral boundary surfaces of the solid electrolyte 3. In order to obtain the desired distance of the casing 5 from the disc 3S, the casing 5 is connected to the current collector 10 which latter extends into the solid electrolyte 3. By an appropriate choice of the length of the current collector 10, the distance of the casing 5 from the lower end of the solid electrolyte can thereby be determined. The storage cell is closed off by a cover plate 11. The current collector 10 goes through this cover plate 11 and extends beyond the latter by a few mm.

Figure 4:
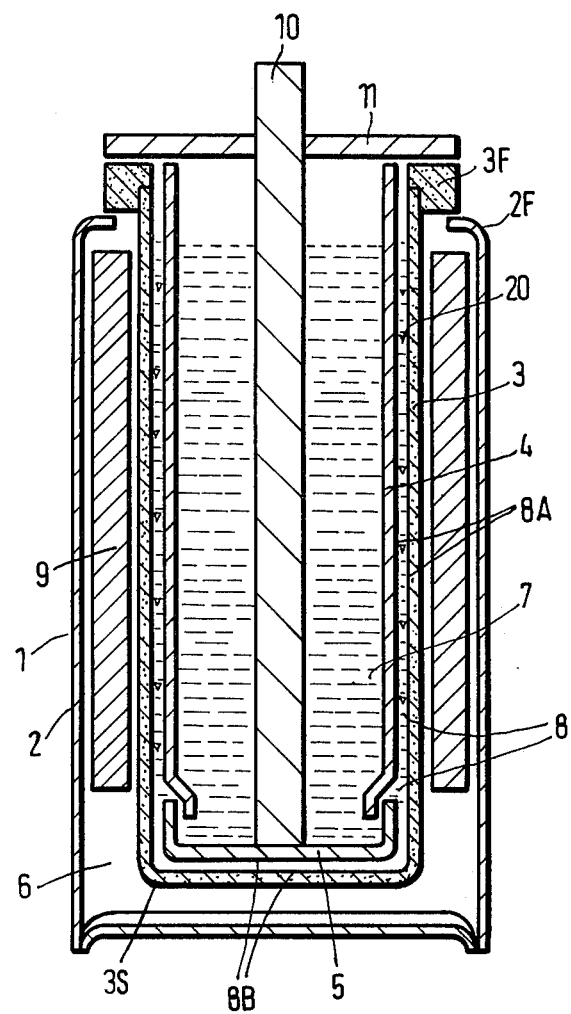
FIG. 4 is a further storage cell showing another modification wherein both the first and second safety zones are in the anode space.

FIG. 4 shows a storage cell 1 in which both safety zones 8A and 8B are arranged inside the anode space. The storage cell is substantially of the same design as the storage cell 1 which is shown in FIG. 1 and is explained in the related description. A difference, it will be noted, is that the casing 5 in the storage cell in FIG. 4 is arranged within the solid electrolyte 3. Casing 5 is a design substantially like the casing 5 shown in FIG. 3, which is also arranged within the solid electrolyte 3. In order to obtain the desired distance between the casing 5 and the closed end of the solid electrolyte 3, the casing 5 is also connected in this embodiment example to the current collector 10 extending into the solid electrolyte 3. Through suitable selection of the length of the current collector 10, any desired distance of the casing 5 from the closed end of the solid electrolyte 3 can be obtained. The distance, however, should not be more than 1 to 2 mm. The region formed between the casing 5 and the closed end of the solid electrolyte 3 serves as the second safety zone 8B which additionally can also be filled with an inert material. The first safety zone 8A is formed by the support element 4 which is arranged within the solid electrolyte 3. The diameter of the support element 4 is chosen so that between its outside surfaces and the inside surfaces of the solid electrolyte 3, a space remains which forms the safety zone 8A. The latter is also filled with a capillary-active material 20. The support element 4 here is slightly shorter than in the other embodiment examples. In addition, its boundary surfaces are bent slightly inwardly at the lower end. As a result a gap remains between the support element 4 and the casing 5. The interior of the support element 4 is filled with sodium. The latter can get through the gap remaining between the support element 4 and the casing 5 into the safety zone 8A. By means of the capillary-active material 20, the sodium is transported to the boundary surfaces of the solid electrolyte 3, so that the surfaces are always wetted with sodium.

Figure 5:
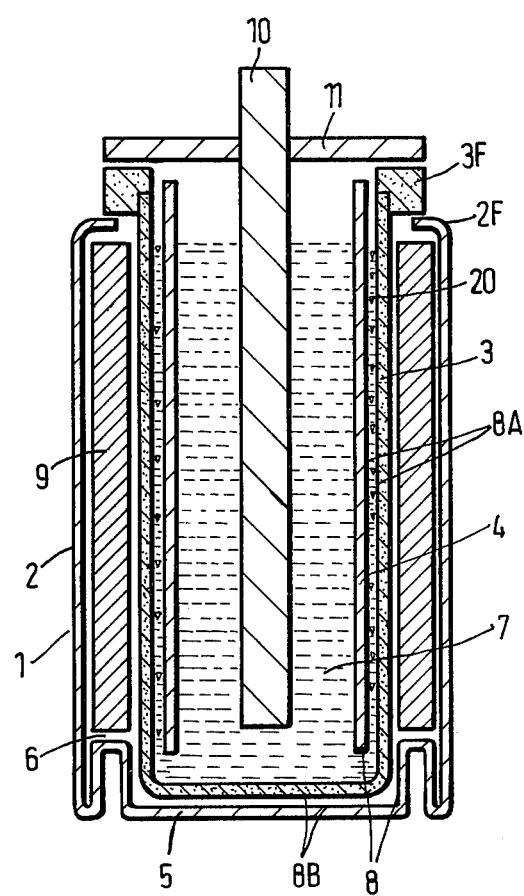
FIG. 5 illustrates a storage cell in which the casing is formed by the bottom of the housing.

The storage cell 1 shown in FIG. 5 is designed, except for the metallic housing 2 and the casing 5 which defines the safety zone 8A in the cathode space, like the storage cell which is shown in FIG. 1 and explained in the related description. In the embodiment example shown here, an extra casing 5 for defining the safety zone 8B in the cathode space 6 is dispensed with. Rather, the casing 5 is formed concurrently with the bottom of the metallic housing 2. For this purpose, the bottom of the metallic housing 2 is matched to the geometry of the closed solid state electrolyte end. In particular, the bottom of the housing 2 has a U-shaped cross section in the vicinity of the solid electrolyte 3. On both sides of the U-shape, the bottom is horizontal. Adjacent to the horizontal, it is bent over downward and is brought to the lower edge of the metallic housing 2. The height of the U-shape is chosen so that the casing 5 formed by the bottom is brought upward a few mm. Thus, casing 5 extends upward, slightly beyond the lower edges of the support element 4 in the solid electrolyte 3. The distance from the bottom of the metal housing 2 is maximally 1 to 2 mm in the vicinity of the solid electrolyte. Between the solid electrolyte and the casing 5, particularly the bottom of the metal housing, an inert material can also be arranged in this embodiment example.

I claim:

1. An electrochemical storage cell or battery of alkali metal and chalcogen comprising at least one anode space receiving the alkali metal anolyte and one cathode space receiving the chalcogen catholyte, an alkali ion-conducting solid electrolyte separating the said reactant spaces from each other, said cell bounded at least in some places by a metallic housing, and a safety space subdivided into at least two safety zones adjoining said solid electrolyte, wherein a first safety zone of said two safety zones is arranged in the anode space parallel to the lateral boundary surfaces of the solid electrolyte and bounded by a support element shaped as a tube open at its bottom also arranged in the anode space, and a second safety zone of said two safety zones is arranged in the cathode space parallel to the closed end of the solid electrolyte and bounded by a casing shaped as a cap also arranged in the cathode space and that the distance between the solid electrolyte, the support element and the casing is at most 1 to 2 mm.

2. Electrochemical storage cell according to claim 1, wherein the anode space is in the interior of the solid electrolyte.

3. Electrochemical storage cell according to claim 1, wherein the anode space is between the solid electrolyte and the metallic housing.

4. Electrochemical storage cell according to claim 1 or claim 2 or claim 3, wherein the solid electrolyte is cup-shaped.

5. Electrochemical storage cell according to claim 1 or claim 2 or claim 3, wherein the solid electrolyte is cup-shaped and has a round dome at its closed end.

6. Electrochemical storage cell according to claim 1 or claim 2 or claim 3, wherein the solid electrolyte is cup-shaped and closed at its closed end by a round disc.

7. Electrochemical storage cell according to claim 1 or claim 2 or claim 3, wherein the two safety zones of the safety space partially overlap.

8. Electrochemical storage cell according to claim 1 or claim 2 or claim 3, wherein the solid electrolyte is cup-shaped, and wherein the two safety zones of the safety space partially overlap.

9. Electrochemical storage cell according to claim 1 or claim 2 or claim 3, wherein the space between the solid electrolyte and the support element is filled with a capillary-active material.

10. Electrochemical storage cell according to claim 1 or claim 2 or claim 3, wherein the solid electrolyte is cup-shaped, wherein the two safety zones of the safety space partially overlap, and wherein the space between the solid electrolyte and the support element is filled with a capillary-active material.

11. Electrochemical storage cell according to claim 1 or claim 2 or claim 3, wherein the support element defining the first safety zone conforms to the geometry of the solid electrolyte.

12. Electrochemical storage cell according to claim 1 or claim 2 or claim 3, wherein the solid electrolyte is cup-shaped and has a round dome at its end, and wherein the support element defining the first safety zone conforms to the geometry of the solid electrolyte.

13. Electrochemical storage cell according to claim 1 or claim 2 or claim 3, wherein the casing conforms to the geometry of the closed solid electrolyte end.

14. Electrochemical storage cell according to claim 1 or claim 2 or claim 3, wherein the solid electrolyte is cup-shaped and has a round dome at its end, and wherein the casing conforms to the geometry of the closed solid electrolyte end.

15. Electrochemical storage cell according to claim 1, wherein an inert material is placed between the casing and the closed end of the solid electrolyte.

16. Electrochemical storage cell according to claim 1, wherein the support element is made of material selected from the group consisting of aluminum, an aluminum alloy and steel.

17. Electrochemical storage cell according to claim 1, wherein the casing is made of a material selected from the group consisting of aluminum, an aluminum alloy, alloy steel, graphite, ceramic and molybdenum.

* * * * *